US009758220B1

(12) United States Patent
Zimmerman et al.

(10) Patent No.: US 9,758,220 B1
(45) Date of Patent: Sep. 12, 2017

(54) WATERCRAFT HAVING RETRACTABLE DRIVE MECHANISM

(71) Applicant: Jackson Kayak, Inc., Sparta, TN (US)

(72) Inventors: Andy Zimmerman, Sparta, TN (US); Terrence J. Gilbert, Sparta, TN (US); Damon Bungard, Spencer, TN (US); Kenneth Clark Causey, Sparta, TN (US)

(73) Assignee: Jackson Kayak, Inc., Sparta, TN (US)

( * ) Notice: Subject to any disclaimer, the term of this patent is extended or adjusted under 35 U.S.C. 154(b) by 0 days.

(21) Appl. No.: 15/097,155

(22) Filed: Apr. 12, 2016

(51) Int. Cl.
*B63H 21/17* (2006.01)
*B63B 35/71* (2006.01)
*B63H 5/125* (2006.01)
*B63H 16/02* (2006.01)

(52) U.S. Cl.
CPC ............. *B63B 35/71* (2013.01); *B63H 5/125* (2013.01); *B63H 16/02* (2013.01); *B63H 21/17* (2013.01); *B63B 2035/715* (2013.01)

(58) Field of Classification Search
CPC .......... B63B 35/71; B63H 5/125; B63H 21/17
USPC ...................................... 440/27, 49
See application file for complete search history.

(56) References Cited

U.S. PATENT DOCUMENTS

| 5,413,066 A * | 5/1995 | Spencer, Jr. ............ B63B 7/082 114/354 |
| 5,836,794 A * | 11/1998 | Krueger ................. B63H 5/125 440/49 |
| 6,855,016 B1 * | 2/2005 | Jansen ................... B63H 16/14 440/27 |
| 2005/0233654 A1 * | 10/2005 | Mueller ................. B63H 3/008 440/49 |
| 2016/0176481 A1 * | 6/2016 | Schiller .................. B63B 1/121 440/30 |

* cited by examiner

*Primary Examiner* — Stephen Avila
(74) *Attorney, Agent, or Firm* — Alleman Hall Creasman & Tuttle LLP

(57) ABSTRACT

Examples are disclosed that relate to watercraft with retractable drive mechanisms. One example provides a watercraft including a hull having a receiving compartment, and also having a deck. The watercraft also includes a drive unit extending through the deck and the hull of the watercraft and being configured to receive rotational input. The drive unit includes a driveshaft and propeller moveable between an extended position in which the propeller is positioned underneath the hull and a retracted position in which the propeller is positioned at least partially within the receiving compartment.

17 Claims, 5 Drawing Sheets

WATERCRAFT HAVING RETRACTABLE DRIVE MECHANISM

BACKGROUND

Recreational watercraft are used in a wide variety of outdoor activities, such as fishing, sightseeing, photography, and exercise. Canoe or kayak paddles are a common mode of propulsion for recreational watercraft. Likewise, some watercraft include pedal-driven or motor driven propulsion systems. Unlike canoe or kayak-driven watercraft, pedal-driven watercraft may allow a user to carry out manual tasks, such as fishing or photography, while propelling the watercraft through the water.

SUMMARY

Examples are disclosed that relate to watercraft with retractable drive mechanisms. One example provides a watercraft including a hull having a receiving compartment, and also having a deck. The watercraft also includes a drive unit extending through the deck and the hull of the watercraft and being configured to receive rotational input. The drive unit includes a driveshaft and propeller moveable between an extended position in which the propeller is positioned underneath the hull and a retracted position in which the propeller is positioned at least partially within the receiving compartment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
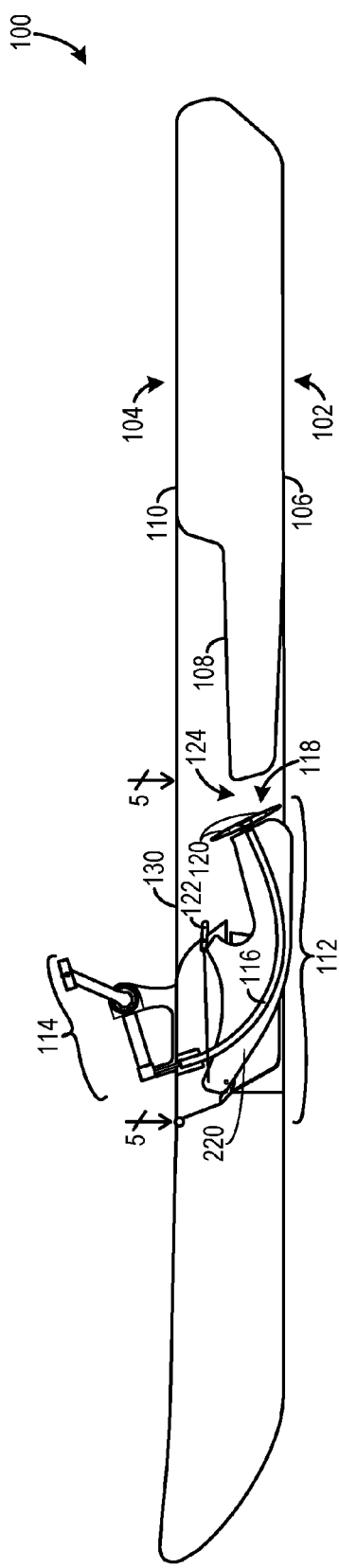
FIG. 1 shows an example watercraft with a retractable drive unit.

As described above, a watercraft may utilize a pedal drive as a propulsion system. Such a drive system may allow a user to perform other tasks, such as casting or reeling in a fishing lure, while propelling the watercraft through the water. Pedal propulsion systems typically include propellers or similar components positioned beneath the hull, which may cause problems in certain operating environments. For instance, propellers positioned beneath the hull may be susceptible to damage or impaired function when water depth is insufficient to provide clearance for the propellers (e.g. when in shallow waters, when beaching the watercraft, when traveling through areas with high concentrations of aquatic plants, etc.), and also exposed to damage during transport and storage. Likewise, the pedal drive system may extend above the gunwale of the boat. As such, placing such a watercraft upside down on a car rack may result in damage to the car roof and/or pedal drive, while placing the watercraft right side up may similarly risk damage to the car roof and/or propeller. Further, multiple units of such boats may be difficult to stack in storage.

To address such issues, a pedal propulsion system may be configured to be removable from a watercraft. However, removing the entire pedal drive and propeller assembly from the boat for shallow water use, storage, and/or transport may be awkward and inconvenient, and the drive system may be large and bulky when removed from the watercraft.

Thus, examples are disclosed herein that relate to recreational watercraft having retractable drive units. As described in more detail below, a retractable drive unit integrated into a watercraft may be moved by a user between an extended and a retracted position. In the extended configuration, a propeller is submerged in the water beneath the hull of the watercraft and positioned to propel the watercraft when rotated. In the retracted configuration the propeller is stowed within a receiving compartment in the hull. In this position, the propeller and other drive unit components are located above a lower surface of the hull. Thus, a user can selectively retract the propeller to protect the propeller from damage, for example, from dragging through plants or along a bottom of a lake, river, or being damaged from impacts and/or stresses during transport and storage. In some examples, the receiving compartment is accessible by a user while seated in the watercraft, thereby providing convenient access for cleaning (e.g. to untangle fishing line or aquatic plants), adjusting the propeller, or repairing the propeller and/or other drive components during use.

The disclosed examples also optionally provide for the removable attachment of different drive mechanisms. This may allow a pedal apparatus and a detachable motor, for example, to be interchanged as desired. In such an example, the pedal apparatus or motor may be stored onboard the watercraft when not in use. Thus, a user can quickly and easily switch the watercraft's drive arrangement during watercraft operation, for example, to adapt to a user's physical state (e.g. rested or fatigued) or environmental conditions (e.g. where inclement weather is rapidly approaching). As described in more detail below, the use of a removable drive mechanism also facilitates the stackability/portability of the watercraft, as drive components may be contained fully within the space between the bottom of the hull and the tops of the gunwales when in the retraced position and with the drive mechanism removed.

FIG. 1 shows a schematic depiction of an example watercraft 100 in the form of a sit-on-top kayak. The watercraft 100 includes a hull 102 having a bottom side 106, and a deck 104 positioned above the hull. The depicted hull 102 may be closed, such as where the watercraft 100 is a sit-on-top kayak, and may have one or more covered or uncovered openings, such as a cockpit, gear or bait storage areas. The deck 104 may include various components, such as a seat platform 108, a rear deck 110, grab handles (not shown), tie-downs (not shown), and a rudder lever (not shown), as examples. In other examples, a watercraft using a drive mechanism as disclosed herein may take any other suitable form than a sit-on-top kayak, such as a closed cockpit kayak, canoe, sailboat, paddleboard, etc.

The watercraft 100 also includes a drive unit 112, depicted in a retracted position in FIG. 1. The drive unit 112 is configured to generate thrust to propel the watercraft 100 through the water. In the depicted example, the drive unit 112 includes a detachable pedal apparatus 114. The detachable pedal apparatus 114 is positioned as being located above the gunwales 130 in the illustrated example. As described in more detail below, the detachable pedal apparatus 114 may be detached from other drive components, such that the other drive components that remain attached to the watercraft are located between a gunwale line and lower hull surface of the watercraft. This may facilitate stacking and transport (e.g. car-top transport) of the watercraft.

The detachable pedal apparatus 114 is configured to provide rotational input to a drive shaft 116 of the drive unit 112 when pedaled by a user of the watercraft. In some examples, the drive shaft may be flexible. The use of a flexible drive shaft may provide for the convenient routing of the drive shaft through a daggerboard 220 of the drive unit 112 between a propeller 118 and the pedal apparatus 114 (or motor). In other examples, any other suitable linkage may be used between the pedal apparatus 114 and the propeller 118. The drive configuration operation is discussed in greater detail herein with regard to FIG. 4.

The propeller 118 is configured to provide thrust to move the watercraft through the water when in the extended position. The propeller 118 may have any suitable configuration. In some examples, the propeller 118 may include three or more blades 120, and the receiving compartment may be sized to receive the propeller 118 in any orientation. This may facilitate the retracting of the propeller compared to a configuration in which a two-bladed propeller is retracted into a narrower slot-like receiver, as such a propeller would have to be aligned with the slot-like receiver prior to retraction. It will be understood that these examples of propeller and receiving compartment configurations are presented for example, and that any other suitable propeller and/or receiving compartment configuration may be used.

Figure 2:
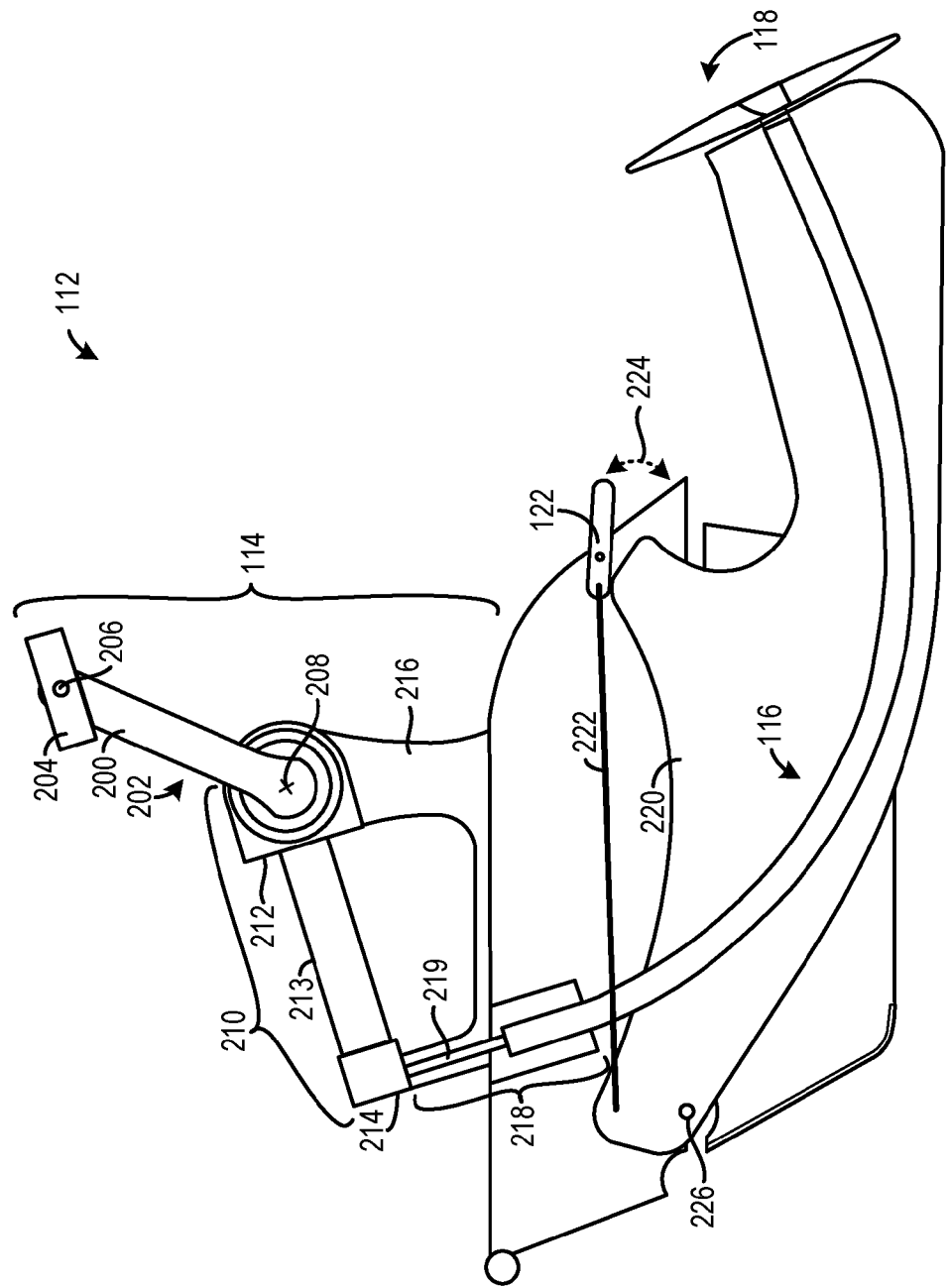
FIG. 2 shows a detailed view of the drive unit of FIG. 1 with the propeller and drive shaft in a retracted position.
Figure 3:
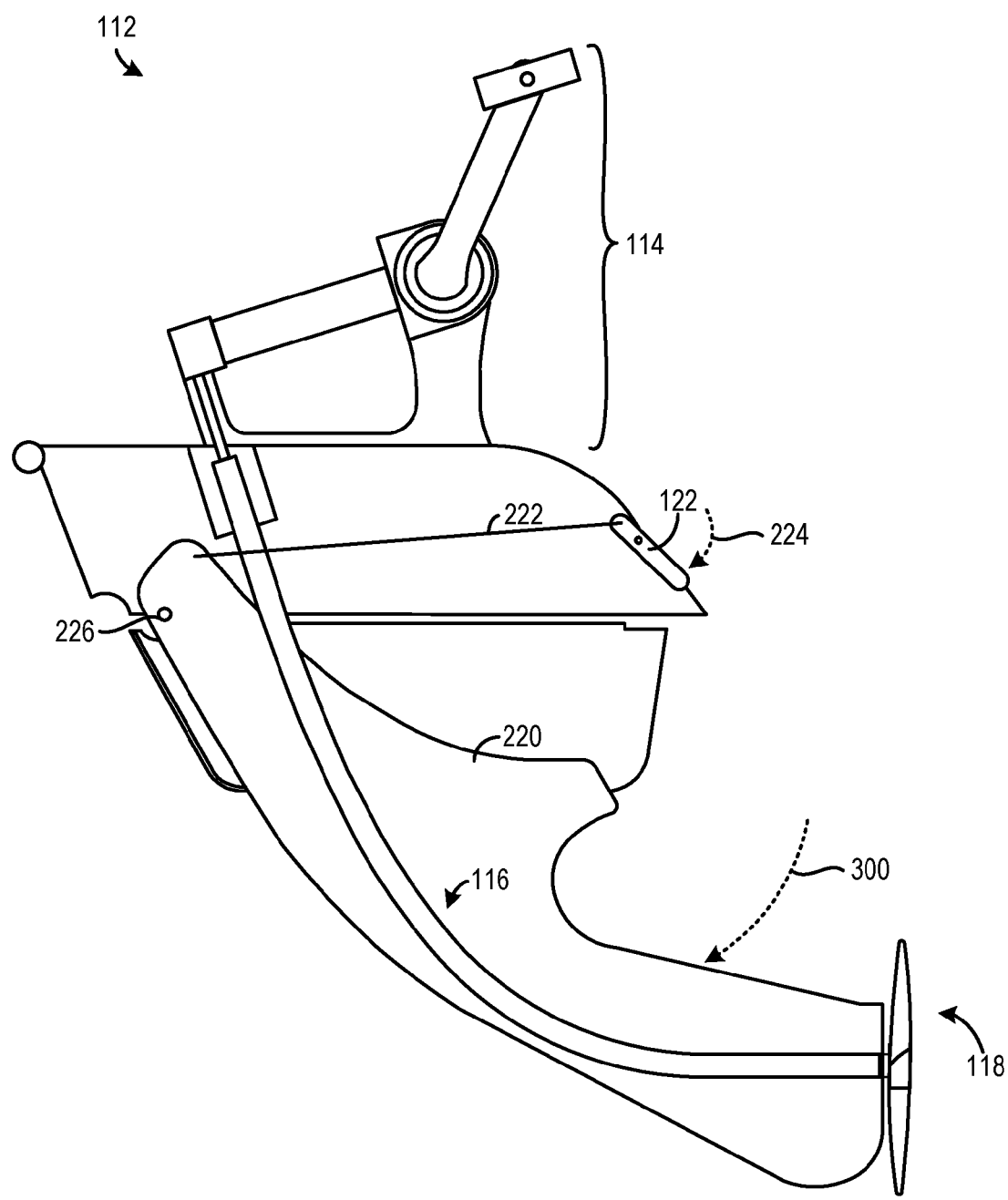
FIG. 3 shows a detailed view of the drive unit of FIG. 1 with the propeller and drive shaft in an extended position.

The drive unit 112 further includes a drive retraction control lever 122. The drive retraction control lever 122 is configured to move the drive shaft 116 and propeller 118 between the retracted position and the extended position. Operation of the drive retraction control lever 122 is illustrated in FIGS. 2 and 3. First, FIG. 2 shows a detailed view of the drive unit 112 in the retracted position. In this position, the propeller 118 is substantially enclosed by the receiving compartment 124, reducing the water depth needed for use of the watercraft and also protecting the propeller from damage in shallow water conditions. As mentioned above, in some examples the receiving compartment 124 may be configured enable a user seated in the watercraft to access the propeller 118 when retracted. This may facilitate cleaning and repair of the propeller during use. In such an example, a moveable cover may extend across a top portion of the receiving compartment 124 to block water from traveling up through the receiving compartment.

Figure 5:
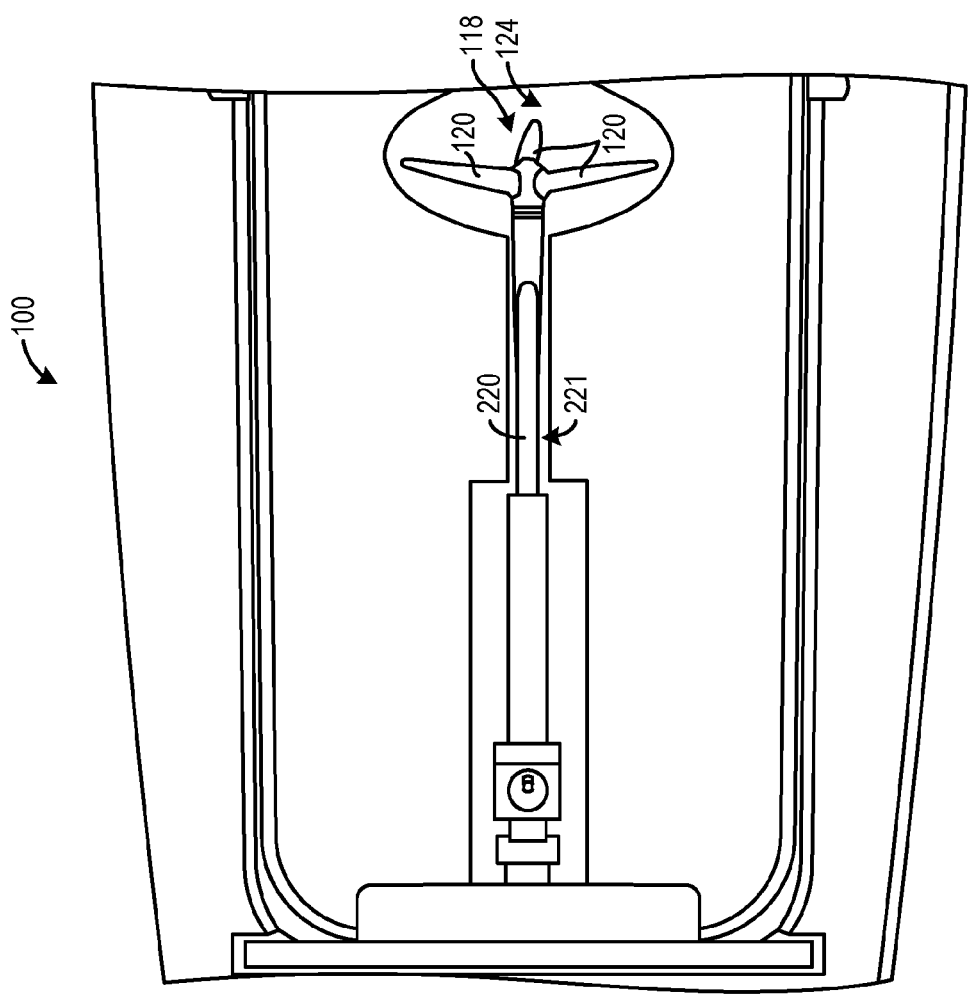
FIG. 5 shows a view of an example receiving compartment of the watercraft of FIG. 1 taken along lines 5 of FIG. 1.

FIG. 5 shows a top view of watercraft 100 taken along lines 5 of FIG. 1, and illustrates the receiving compartment 124. The daggerboard 220 and other drive components are also visible in this view. The propeller 118 is depicted in FIG. 5 in the retracted configuration, such that propeller 118 is situated within the receiving compartment 124. The propeller 118 is depicted as having three blades 120 in FIG. 5, but other propellers having different number of blades also may be used. FIG. 5 also shows a slot 221 provided in the hull to accommodate the daggerboard 220. The receiving compartment 124 has a rounded shape to accommodate the blades 120 of the propeller 118 in any orientation, such that the propeller does not need to be put into a particular orientation before retracting. Other suitable receiving compartment shapes also may be used, such as a suitably sized rectangular shape.

Returning to FIG. 2, the pedal apparatus 114 includes first arm 200 of a crankshaft 202, and a pedal 204 coupled to the arm 200. The pedal 204 is configured to rotate about a pedal rotational axis 206, and the crankshaft 202 is configured to rotate about a crankshaft axis 208. A second arm of the crankshaft 202 and a second pedal are occluded from view in FIG. 2.

The detachable pedal apparatus 114 further includes a gearbox 210. In the depicted example, the gearbox 210 is removed from the watercraft along with the pedal 204, crankshaft 202, etc. when interchanged with a motor or other drive mechanism. In other examples, the gearbox 210 and the detachable pedal apparatus 114 may be separate components, such that the crankshaft and the pedals are removable while the gearbox 210 remains fixed to drive shaft 116.

As mentioned above, in some examples the drive shaft 116 may be flexible. The use of a flexible drive may provide for the convenient routing of the drive shaft through a body of the drive unit between a propeller 118 and the pedal apparatus 114 (or motor), and facilitate the retraction/extension of the propeller. Any suitable type of flexible drive shaft may be used. For example, a flexible drive shaft may include a rotatable wire rope or coil that is torsionally rigid but that can be flexed. Such a rotatable wire rope or coil may be positioned inside of non-rotating cover. As another example, a drive shaft may include a plurality of non-flexible sections connected by flexible joints. In yet another example, a drive shaft may include a plurality of universal joints.

The gearbox 210 may include gearing to change a propeller rotational speed compared to a pedal rotational speed. In the depicted example, this is achieved by a first section 212 of the gearbox 210 configured to increase the input to output speed ratio in the gearbox 210. In one example, the gearbox 210 may have an input speed to output speed ratio of between 8 and 14. In other examples, any other suitable speed ratio may be used. Further, in some examples, changeable gearings may be provided to allow the speed ratio to be adjusted.

The gearbox 210 also includes a second section 214 configured to change the direction of angular output of the gearbox. A connector shaft 213 is shown extending between the first section 212 and the second section 214. In the illustrated example, the angle between an axial direction of rotational input and an axial direction of rotational output is 90 degrees, but other examples may have other suitable angles either above or below 90 degrees. In other examples, the first section 212 may connect directly to driveshaft 116 without the use of second section 214.

The drive unit 112 also includes a support structure 216 to support the pedal apparatus 114 at a desired position relative to a user seated on the watercraft 100. The support structure 216 may be attached to the hull via clips, pins, etc., and/or may mate with a recess in the hull 102, as shown in FIG. 1. The support structure 216 may also aid in detaching the pedal apparatus 114. For instance, the support structure 216 may be easily grasped by a user when removing the pedal apparatus 114.

The drive unit 112 further includes an input coupling 218 configured to receive rotational input from the pedal apparatus 114 or motor. The input coupling 218 includes a shaft extension 219 mating with the second section 212 of the gearbox 210. The input coupling 218 may comprise a quick disconnect coupling enabling a user to rapidly remove the detachable input apparatus 114 without the use of any tools, for convenient switchover during watercraft use.

The drive shaft 116 and propeller 118 are connected to the daggerboard 220, which provides support for the drive shaft and propeller. In the depicted example, the drive shaft 116 extends through an interior of the daggerboard 220, and thus is protected by the daggerboard. However, the drive shaft may have any other suitable routing in other examples. The drive retraction control lever 122 is attached to the daggerboard 220 via mechanical linkage 222, and the daggerboard 220 is coupled to the hull via a pivot. The drive retraction control lever 122 may be moved, as indicated via arrow 224, to move the mechanical linkage 222. Movement of the mechanical linkage 222 pivots the flexible drive shaft 116 and propeller 118 between the retracted position and extended position, shown in FIG. 3 and discussed in greater detail herein. More specifically, movement of the drive retraction control lever 122 causes the mechanical linkage 222 to apply a force to an upper portion of the daggerboard 220, causing the daggerboard 220 to pivot about daggerboard axis 226.

FIG. 3 shows the drive shaft 116 and propeller 118 in an extended position. Arrow 224 indicates the actuation movement of the drive retraction control lever 122 to move the drive shaft 116 and propeller into the extended position, and arrow 300 illustrates the resulting movement of the flexible drive shaft 116 and daggerboard 220. As previously discussed, movement of the drive retraction control lever 122 shifts the mechanical linkage 222 to rotate the daggerboard 220 about the daggerboard axis 226. A bearing, bushing, or other suitable mechanism may be included in the daggerboard 220 to enable the daggerboard 220 to rotate about the daggerboard axis 226.

Figure 4:
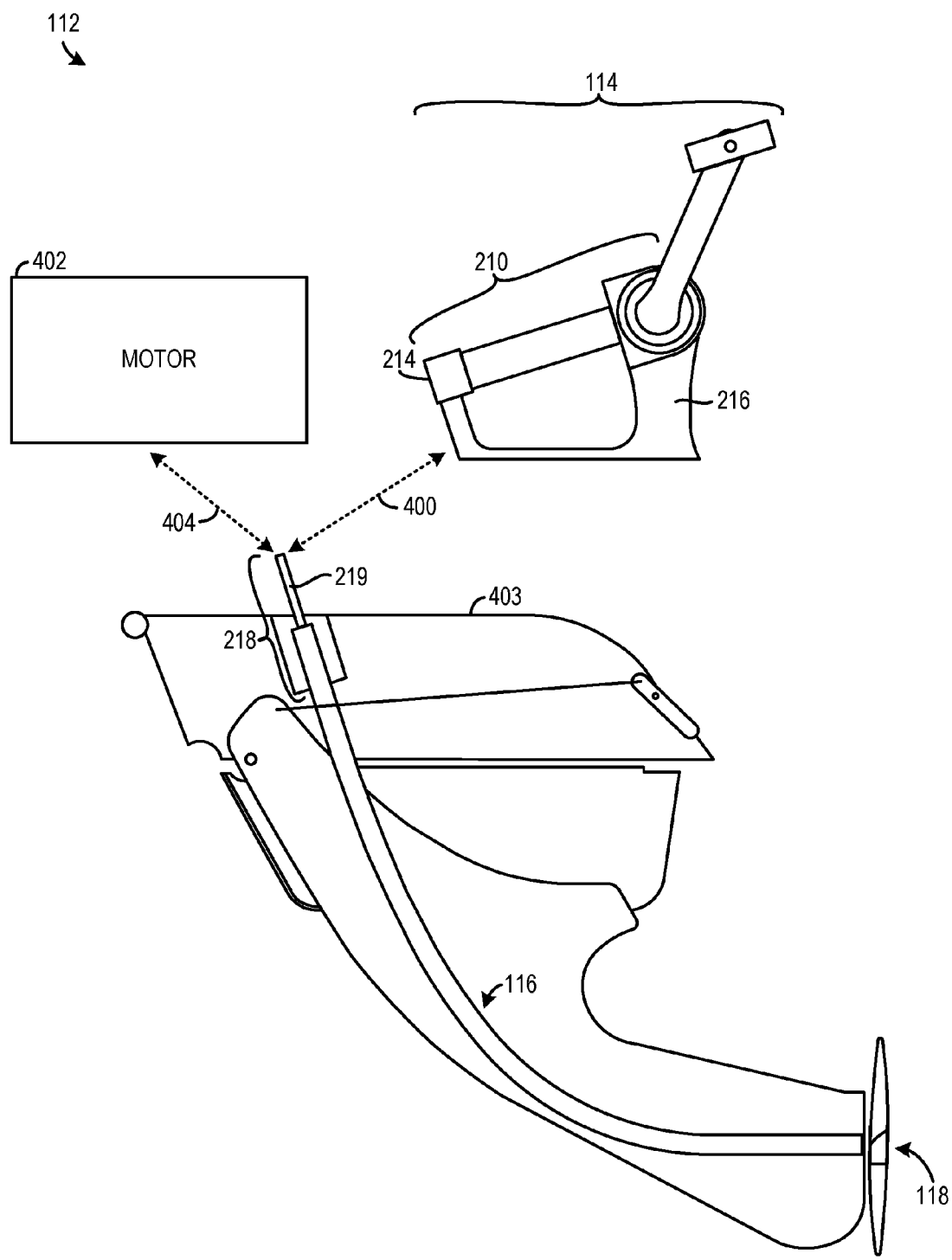
FIG. 4 shows a view of the drive unit with a detachable pedal apparatus detached from the drive unit.

FIG. 4 shows the detachable pedal apparatus 114 removed from the input coupling 218, indicated via arrow 400. The propeller 118 and the flexible drive shaft 116 in the drive unit 112 are in the extended position in FIG. 4, but the detachable pedal apparatus 114 also may be detached when the propeller 118 and the flexible drive shaft 116 are in a retracted position.

To remove the detachable pedal apparatus 114 the user may pull the detachable pedal apparatus 114 in a direction away from the input coupling 218 to remove the apparatus in one motion. In this way, the detachable pedal apparatus 114 may be quickly and easily removed by a user. In another example, the user may first decouple the input coupling 218 from the second section 214 of the gearbox 210. Once the input coupling 218 is decoupled from the gearbox 210, the user may then grasp the detachable pedal apparatus 114 and move the apparatus to a compartment in the watercraft 100, shown in FIG. 1. In this configuration, the parts of the drive that remain attached to the boat are located between the gunwale line and the bottom surface of the hull, and are thus protected from damage, thereby allowing the watercraft to be stacked with other watercraft for storage, to be transported on a roof rack, etc. The pedal apparatus 114 may be reattached simply by recoupling the second section 214 of the gearbox 210 to the input coupling 218 of the drive shaft 116, and attaching the support structure 216 to a lower section 403 of the drive unit 112. In some examples, the input coupling 218 may be configured to be detached from the gearbox 210 without the use of tools, while tools may be utilized in other examples. Further in some examples, additional coupling mechanisms may be used to secure the detachable pedal apparatus 114 to the drive unit 112 such as bolts, pins, clips, etc. Additionally, in some examples, the support structure 216 may remain attached to the watercraft when the detachable pedal apparatus 114 is removed from the hull of the watercraft. Such a structure may be used where the gunwale line is high enough to extend above the support structure 216, for example.

FIG. 4 also schematically shows a motor 402 configured to be attached to input coupling 218, as indicated via arrow 404. The motor 402 may be configured to receive the shaft extension 219 and provide rotational output thereto via a driveshaft and gearing configured to attach to the shaft extension 219. The motor 402 may also include other coupling devices for attaching the motor to the drive unit such as bolts, pins, clips, etc. The depicted configuration may allow a user to quickly switch between a motor drive and a pedal drive as desired. Any suitable motor may be used, such as electric motors and gas-powered motors.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A watercraft, comprising:
a hull comprising a receiving compartment;
a deck positioned above the hull;
a drive unit extending through the deck and the hull of the watercraft, the drive unit comprising:
an input coupling configured to receive rotational input,
a flexible drive shaft connecting the input coupling to a propeller, the flexible drive shaft and propeller moveable between an extended position in which the propeller is positioned underneath a bottom side of the hull and a retracted position in which the propeller is positioned at least partially within the receiving compartment; and
a drive retraction control lever linked to the drive unit to move the flexible drive shaft and propeller between the extended and retracted positions.

2. The watercraft of claim 1, further comprising a detachable pedal apparatus positioned above the deck of the watercraft, where the input coupling is configured to receive rotational input from the detachable pedal apparatus in a user powered configuration.

3. The watercraft of claim 2, further comprising a detachable motor, where the input coupling is configured to receive rotational input from the detachable motor in a motor powered configuration.

4. The watercraft of claim 3, where the detachable motor is an electric motor coupled to a battery.

5. The watercraft of claim 1, where the input coupling is a quick disconnect coupling.

6. The watercraft of claim 1, further comprising a gearbox coupled to the input coupling, the gearbox having an input speed to output speed ratio of between 8 and 14.

7. The watercraft of claim 1, where the propeller includes three or more blades.

8. The watercraft of claim 1, where the flexible drive shaft is supported by a daggerboard attached to the hull via a pivot, the drive retraction control lever being configured to pivot the propeller between the extended and retracted positions.

9. The watercraft of claim 1, where the input coupling is configured to receive rotational input from a detachable pedal apparatus in a user powered configuration.

10. The watercraft of claim 9, where the input coupling is configured to receive rotational input from a detachable motor in a motor powered configuration.

11. The watercraft of claim 10, where the flexible drive shaft is supported by a shaft support attached to the hull via a pivot, the drive retraction control lever being configured to pivot the propeller between the extended and retracted positions.

12. A watercraft, comprising:
- a hull comprising a receiving compartment;
- a deck positioned above the hull; and
- a drive unit extending through the deck and the hull of the watercraft, the drive unit comprising:
  - an input coupling configured to receive rotational input,
  - a flexible drive shaft rotationally connecting the input coupling to a propeller, the flexible drive shaft and propeller moveable between an extended position where the propeller is positioned underneath a bottom side of the hull and a retracted position where the propeller is positioned in the receiving compartment,
  - a detachable pedal apparatus including a gearbox coupled to pedals; and
- a drive retraction control lever linked to the drive unit to move the flexible drive shaft and the propeller between the extended and retracted positions.

13. A watercraft comprising:
- a hull comprising a receiving compartment;
- a deck positioned above the hull;
- a detachable pedal apparatus positioned above the deck; and
- a drive unit extending through the deck and the hull of the watercraft, the drive unit comprising:
  - an input coupling configured to receive rotational input from the detachable pedal apparatus in a user powered configuration, and
  - a flexible drive shaft supported by a shaft support attached to the hull via a pivot and connecting the input coupling to a propeller, the flexible drive shaft and the propeller moveable between an extended position where the propeller is positioned underneath a bottom side of the hull and a retracted position where the propeller is positioned in the receiving compartment; and
- a drive retraction control lever configured to pivot the propeller between the extended and retracted positions.

14. The watercraft of claim 13, further comprising a motor that is interchangeable with the detachable pedal apparatus.

15. The watercraft of claim 13, where the detachable pedal apparatus includes a gearbox configured to change an input speed to output speed radio of the drive unit.

16. The watercraft of claim 13, where the watercraft is a sit-on-top kayak.

17. The watercraft of claim 13, where the propeller includes three or more blades.

\* \* \* \* \*